(12) United States Patent
Sharp et al.

(10) Patent No.: US 6,378,436 B1
(45) Date of Patent: Apr. 30, 2002

(54) PORTABLE PROPELLANT CUTTING ASSEMBLY, AND METHOD OF CUTTING PROPELLANT WITH ASSEMBLY

(75) Inventors: Roger A. Sharp, Brigham City; Shawn W. Hoskins; Brett D. Payne, both of Tremonton, all of UT (US)

(73) Assignee: Cordant Technologies Inc., Salt Lake City, UT (US)

( * ) Notice: Subject to any disclaimer, the term of this patent is extended or adjusted under 35 U.S.C. 154(b) by 0 days.

(21) Appl. No.: 09/506,597

(22) Filed: Feb. 18, 2000

Related U.S. Application Data

(60) Provisional application No. 60/125,644, filed on Feb. 22, 1999.

(51) Int. Cl.[7] .................................................. C06D 5/06

(52) U.S. Cl. ........................ 102/287; 102/290; 102/292; 102/293; 86/20; 86/12

(58) Field of Search ................................. 102/287, 288, 102/289, 290, 291, 292, 293; 86/20, 12

(56) References Cited

U.S. PATENT DOCUMENTS

| | | | | | |
|---|---|---|---|---|---|
| 802,347 | A | * | 10/1905 | Aspinwall | 102/292 |
| 930,979 | A | * | 8/1909 | Maxim | 102/292 |
| 3,183,665 | A | * | 5/1965 | Webb | 102/287 |
| 4,148,187 | A | * | 4/1979 | Younkin | 102/287 X |
| 4,552,706 | A | * | 11/1985 | Ducote | 102/290 X |
| 5,417,161 | A | * | 5/1995 | Sanai et al. | 102/290 |
| 5,892,172 | A | * | 4/1999 | Candland et al. | 102/292 |

* cited by examiner

Primary Examiner—Peter A. Nelson

(57) ABSTRACT

A propellant cutting assembly and method of using the assembly to cut samples of solid propellant in a repeatable and consistent manner is disclosed. The cutting assembly utilizes two parallel extension beams which are shorter than the diameter of a central bore of an annular solid propellant grain and can be loaded into the central bore. The assembly is equipped with retaining heads at its respective ends and an adjustment mechanism to position and wedge the assembly within the central bore. One end of the assembly is equipped with a cutting blade apparatus which can be extended beyond the end of the extension beams to cut into the solid propellant.

9 Claims, 3 Drawing Sheets

PORTABLE PROPELLANT CUTTING ASSEMBLY, AND METHOD OF CUTTING PROPELLANT WITH ASSEMBLY

RELATED APPLICATION

This application claims the benefit of U.S. provisional application No. 60/125,644, filed Feb. 22, 1999.

GOVERNMENT LICENSE RIGHTS

The U.S. Government has a paid-up license in this invention and the right in limited circumstances to require the patent owner to license others on reasonable terms as provided for by the terms of contract NAS8-38100 awarded by NASA.

BACKGROUND OF THE INVENTION

1. Field of the Invention

This invention relates to an assembly for cutting samples from a center-perforated solid propellant grain for testing and evaluation purposes, and to a method of cutting the solid propellant grain with the assembly.

2. Description of the Related Art

Solid propellant rocket motors contain a solid propellant comprised of various ingredients, including binders, for example, curing agents and catalysts, fuels, oxidizers, and fillers. The presence of each of these ingredients in acceptable concentrations and consistencies is essential for ensuring proper and predictable motor operation upon ignition of the solid propellant.

Therefore, substantial amounts of testing are performed on solid propellant grains. These tests usually involve removing a sample from the propellant grain after it is cast and cured. Removal of the propellant grain sample has conventionally involved the use of manual cutting tools, such as knives and saws. However, a drawback of manual cutting of the propellant grain is production of inconsistent shaped samples with insufficiently smooth surfaces to permit satisfactory analysis and testing. Another drawback of these manual techniques is that the manual cutting of the propellant grain places the operator at great risk from, for instance, an accidental ignition of the propellant.

SUMMARY OF THE INVENTION

It is therefore an object of this invention to provide a propellant cutting assembly and process that significantly improves the repeatability and consistency of the cut sample while reducing the risk from accidental ignition.

In accordance with the principles of this invention, this and other objects are attained by the provision of a solid propellant cutting assembly suitable for making radial cuts into an annular solid propellant grain having a central bore of a predetermined diameter. In accordance with an embodiment of this invention, the assembly comprises one or more extension beams extending in length between a proximal end and a distal end thereof. The length of the extension beams is less than the diameter of the central bore so as to permit the assembly to be loaded into the central bore. Proximal and distal retaining heads are respectively provided at proximal and distal ends of the extension beams. Preferably, the retaining heads have respective curvilinear surfaces that are complementary to an inner surface of the central bore and face away from the extension beams. An adjustment mechanism interposed between the extension beams and either the distal retaining head or the proximal retaining head permits relative movement of the distal and proximal retaining heads away from and towards each other. When the retaining heads are moved towards each other into a loading position, the distance between the curvilinear surfaces of the distal and proximal retaining heads is less than the diameter of the central bore. As a consequence, the assembly may be loaded into the central bore and positioned so that the extension beams are oriented as desired. The adjustment mechanism can then be actuated to increase the distance between the proximal and distal retaining heads so that the distance between the curvilinear surfaces of the distal and proximal retaining heads is substantially equal, but slightly smaller than, the diameter of the central bore. As a consequence, the curvilinear surfaces of the heads contact diametrically opposed positions of the inner surface of the propellant grain and wedge the assembly into position. A cutting blade assembly is provided at the proximal end of the extension beams. A driving mechanism is provided to drive the cutting blade past the ends of the extension beams and into the solid propellant. A level is also provided to orient the blade appropriately for achieving a cut of uniform thickness.

This invention is also directed to a process of making radial cuts in a propellant grain with the above-discussed assembly for the purpose of removing samples for testing and analysis.

This invention may be used for sampling various types of central-perforatedpropellant grains and hybrid fuel grains.

These and other objects, features, and advantages of the present invention will become apparent from the following detailed description which, when taken in conjunction with the accompanying drawings, serve to further describe the principles of this invention.

BRIEF DESCRIPTION OF THE DRAWINGS

The accompanying drawings serve to elucidate the principles of this invention. In such drawings.

DETAILED DESCRIPTION OF THE INVENTION

In the illustrated embodiment, the assembly includes two parallel extension beams 10. Preferably, the beams 10 are made of a high strength aluminum, although other metals and alloys may be used, so long as the material has sufficient strength to retain its structure and configuration during operation. At the distal end of the extension beams 10, a traversing bar 12 connects the beams 10 and maintains the parallel spacing between the distal ends of the beams 10. A platform 14 arranged in proximity to the proximal end of the extension beams 10 maintains the parallel spacing of the beams 10 at the proximate end.

The extension beams 10 and platform 14 may be made from Aluminum 6061-T6 or 6063-T52.

Figure 1:
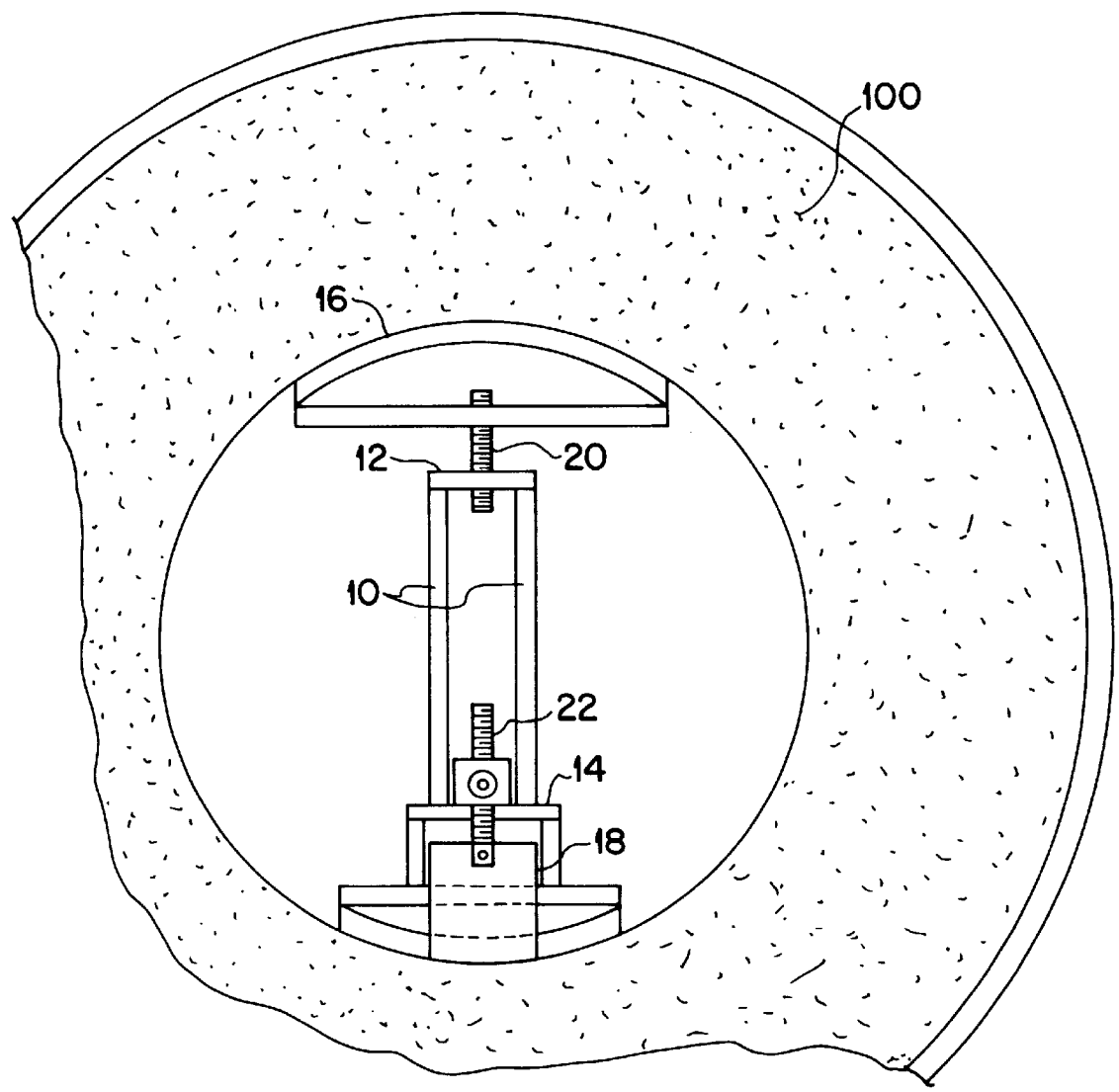
FIG. 1 is a schematic overhead view of a propellant cutting assembly in accordance with an embodiment of this invention, with the assembly being shown loaded into the central bore of a propellant grain and in an operative position.
Figure 3:
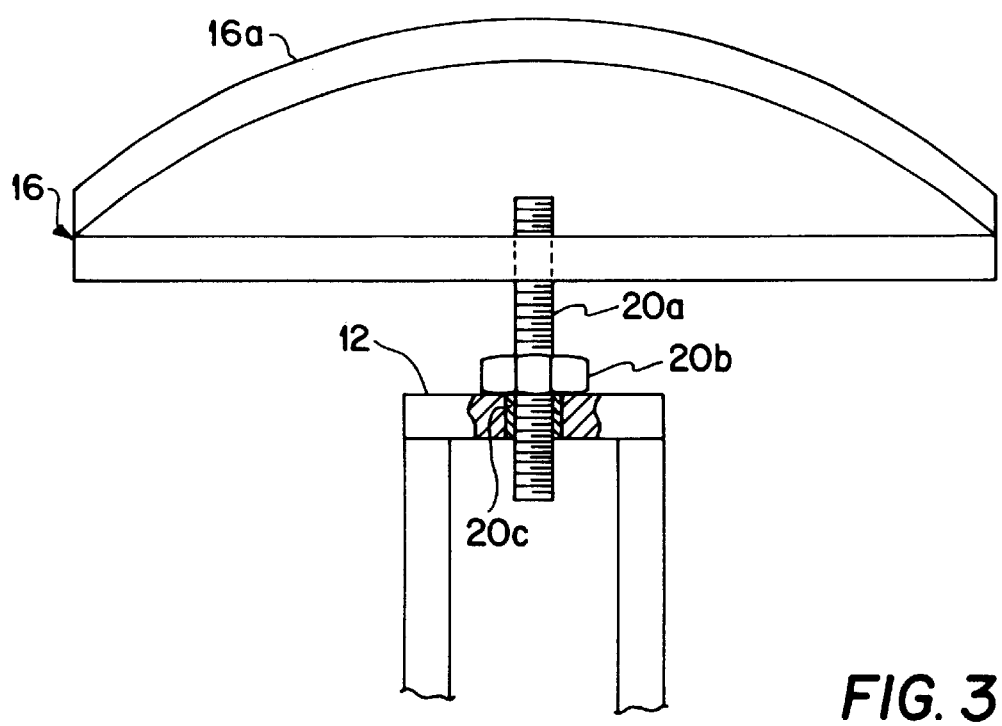
FIG. 3 is an enlarged schematic view of a subassembly of the assembly of FIG. 1, showing an adjustment mechanism operatively connecting a distal retaining head to extension beams.

As shown in FIGS. 1 and 3, distal retaining head 16 includes an outer surface with a curvilinear face having a diameter matching that of the inner surface of the propellant grain 100. During radial cutting of the propellant grain 100, movement of blade 18 into the propellant 100 imparts a load in the opposite direction, i.e., towards the distal retaining head 16. Configuring the curvilinear surface of the distal retaining head 16 to be complementary to the inner surface of the propellant grain 100 optimizes interfacial contact and, hence, distribution of this load over a greater portion of the propellant grain 100. The retaining heads may include a padding 16a, such as rubber, on the curvilinear surfaces.

In the illustrated embodiment, an adjusting mechanism 20 is interposed between the extension beams 10 and the distal retaining head 16. By way of example and without limitation, the adjusting mechanism 20 can have a stud 20a with a screw threaded outer surface region in cooperative engagement with a screw-threaded aperture of the traversing bar 12, as is shown in FIG. 3. Reference numerals 20b and 20c designate a nut and bushing, respectively. Rotation of the screw-threaded adjusting mechanism in the appropriate direction moves the screw away from the traversing bar 12, thereby increasing the distance between the distal and proximal heads.

Figure 2:
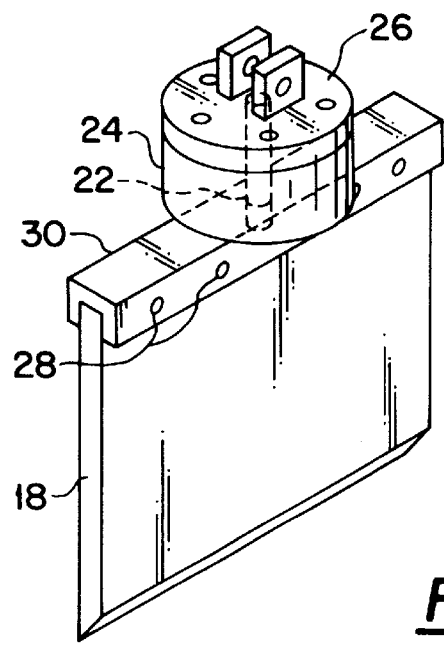
FIG. 2 is an enlarged schematic view of a subassembly of the assembly of FIG. 1, showing a cutting blade in cooperative association with a load cell.

As shown in FIG. 2, a screw jack 22 is positioned on the platform 14 and cooperatively engaged with the blade 18 via an optional load cell 24 and bracket 26. Reference numeral 28 designates set screws for attaching block 30 to the blade 18. The load cell 24 measures the force applied to the blade 18 to monitor for irregularities and permit repeatability of the testing. A suitable load cell 24 is an Omegadyne LC402-2K with a DP 25-5 meter and PT106F-10-6S connector. The screw jack 22 is driven by an air motor, although other motors and driving mechanism may be used and would be apparent to those skilled in the art when considered in conjunction with this disclosure. For example, an electric or hydraulic motor may be used. A flow control valve may be used to provide variable control over the rate at which the screw jack 22 is rotated. The motor may be equipped with a gear reducer to control torque. Design of a suitable gear reducer is within the purview of those skilled in the art. As is evident from this description, the illustrated embodiment permits the operator to control the cutting operation from a remote location.

Figures 4, 5:
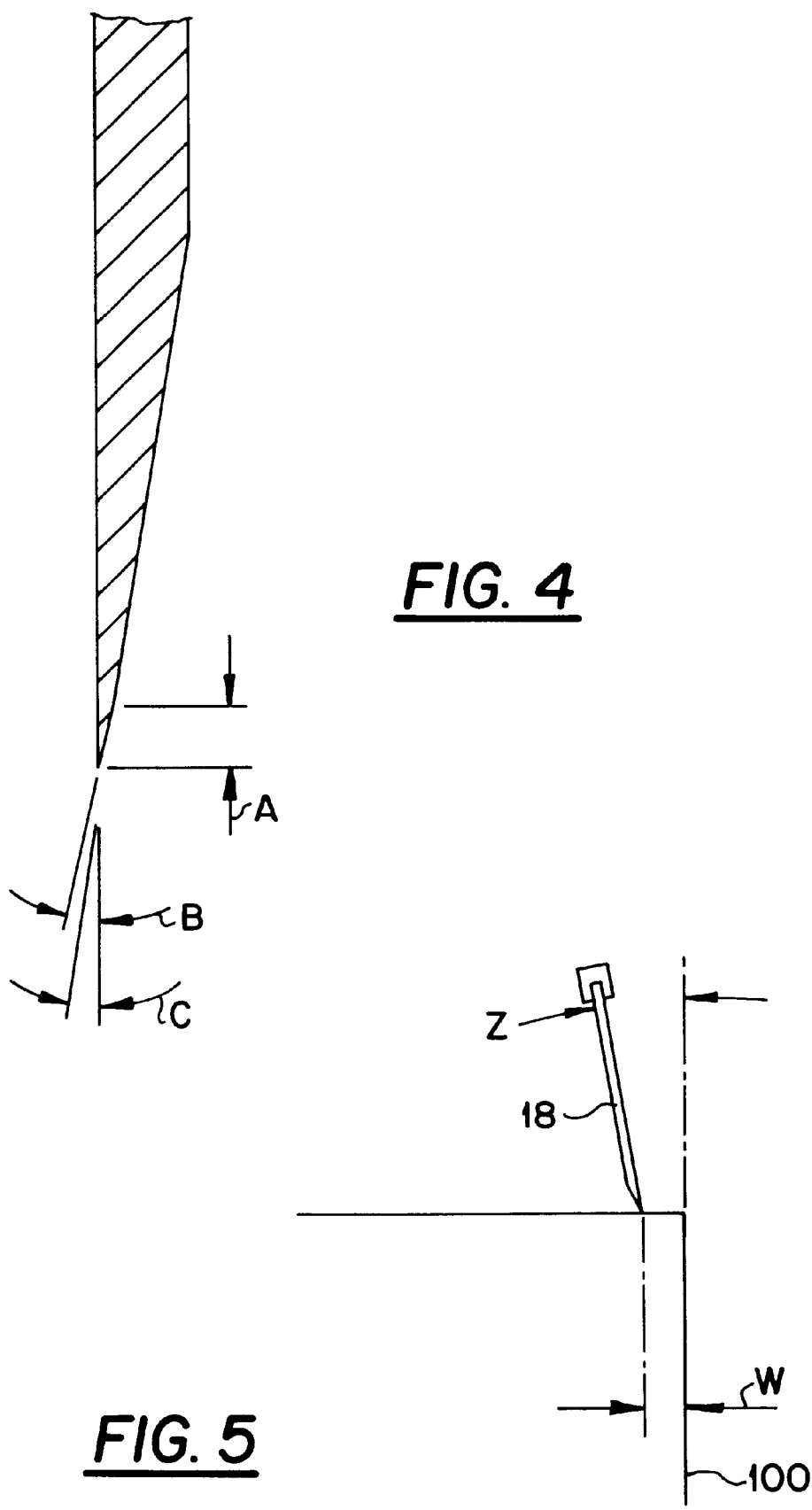
FIG. 4 is a cross-sectional view of a cutting blade.
FIG. 5 is an overhead view depicting the relative position between the blade and the propellant grain during cutting operation.

In a preferred embodiment, the blade 18 is made of 17-4 PH stainless steel, and has a curvilinear edge, which preferably is complementary to the bore-defining inner surface of the propellant grain 100. As shown in FIG. 4, the blade 18 preferably has a flat back with a double bevel. Preferably, the length of the lower bevel (A) is 0.125 inch; angle B is 8 to 12 degrees, preferably 10 degrees; and angle C is 5 to 9 degrees, preferably 7 degrees.

A preferred cutting operation will now be explained with reference to FIG. 5. Prior to making a radial cut with the assembly, longitudinal cuts are made into the propellant grain 100 manually, with the longitudinal cuts being spaced by a distance no greater than the width of the cutting blade 18 so as to avoid tearing of the propellant 100. As shown in FIG. 5, the distance Z (i.e., between the non-cutting edge of the blade 18 and the edge of the propellant 100) was about 1.55 to 1.60 inches, whereas the distance W (between the cutting edge of the blade and the edge of the propellant 100) was about 1.25 inches. The length of the blade was about 9.75 inches. In this manner, a radial cut of substantially uniform thickness was obtained using as little as 204 lbs. of cutting force.

The cutting blade 18 is extended past the ends of the extension beams and into the solid propellant 100 to cut into the propellant 100. The cutting blade 18 is driven and controlled by the screw jack mechanism 22 and the load exerted can be monitored by the load cell 24.

The foregoing detailed description of the preferred embodiments of the invention has been provided for the purposes of illustration and description. It is not intended to be exhaustive or to limit the invention to the precise embodiments disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention cover various modifications and equivalents included within the spirit and scope of the appended claims.

We claim:

1. A solid propellant cutting assembly suitable for making radial cuts into an annular solid propellant grain having a central bore of a predetermined diameter, said assembly comprising:

one or more extension beams extending in length between a proximal end and a distal end, the length of said extension beams being less than the diameter of the central bore;

a distal retaining head provided at said distal end of said extension beams, said distal retaining head having a curvilinear surface that is complementary to an inner surface of the central bore and faces away from said extension beams;

a proximal retaining head provided at said proximal end of said extension beams, said proximal retaining head having a curvilinear surface that is complementary to the inner surface of the central bore and faces away from said extension beams;

an adjustment mechanism cooperatively connecting said extension beams to either said distal retaining head or said proximal retaining head, said adjustment mechanism being constructed and arranged to permit relative movement of said distal and proximal retaining heads towards and away from each other between a loading position, in which the distance between said curvilinear surfaces of said distal and proximal retaining heads is less than the diameter of the central bore to permit loading of said assembly into said central bore, and an operative position, in which the distance between said curvilinear surfaces of said distal and proximal retaining heads is approximately equal to the diameter of the central bore to permit said support beams and retaining heads to be collectively wedged in and supported at diametrically opposed positions of the inner surface of the solid propellant grain;

a planar blade having a cutting edge, said blade being movable along at least a portion of the length of said extension beams to a position in which said blade extends beyond said proximal end of said extension beams so that, by placing said assembly in the operative position, movement of said cutting edge of said blade by a sufficient distance beyond said proximal end makes a radial cut into the solid propellant grain; and a level constructed and arranged to control the orientation of said blade relative to the propellant grain when said assembly is in the operative position.

2. An assembly according to claim 1, further comprising a piston for moving said blade relative to said extension beams.

3. An assembly according to claim 2, wherein said piston is a screw jack.

4. An assembly according to claim 2, further comprising a motor for driving the piston relative to said extension beams.

5. An assembly according to claim 4, further comprising a gear reducer for controlling cutting speed.

6. An assembly according to claim 1, further comprising a load cell for measuring cutting force.

7. An assembly according to claim 1, wherein said blade is remotely operable.

8. A process for cutting samples from an annular solid propellant grain having a central bore of a predetermined diameter, said process comprising:

provided the assembly of claim 1;

positioning the assembly within the central bore of the solid propellant grain;

orienting the extension beams and blade to permit movement of said blade along a horizontal direction and moving the distal and proximal retaining heads away from each other via the adjustment mechanism to wedge the assembly between diametrically opposed portions of the inner surface of the solid propellant grain;

cutting longitudinal seams into the propellant grain, the seams being spaced by a distance no greater than the width of the blade; and making a radial cut into the propellant grain with the blade between the seams to obtain a sample.

9. A process according to claim 8, wherein the propellant grain is cut to a thickness of about 1.25 inches.

* * * * *